United States Patent
Maeda et al.

(10) Patent No.: US 6,780,832 B1
(45) Date of Patent: Aug. 24, 2004

(54) WATER-SOLUBLE POLYMER AND ITS USE

(75) Inventors: Yoshihiro Maeda, Toride (JP); Akiko Hemmi, Osaka (JP); Shigeru Yamaguchi, Yao (JP)

(73) Assignee: Nippon Shokubai Co., Ltd., Osaka (JP)

( * ) Notice: Subject to any disclaimer, the term of this patent is extended or adjusted under 35 U.S.C. 154(b) by 465 days.

(21) Appl. No.: 09/703,959

(22) Filed: Nov. 1, 2000

(30) Foreign Application Priority Data

Nov. 15, 1999 (JP) ............................................ 11-324414
Apr. 25, 2000 (JP) ........................................ 2000-124053

(51) Int. Cl.$^7$ ................................................. C11D 3/37
(52) U.S. Cl. ........................ 510/477; 510/229; 510/361; 510/434; 510/476; 510/488; 510/533
(58) Field of Search ................................ 510/229, 361, 510/434, 476, 477, 488, 533

(56) References Cited

U.S. PATENT DOCUMENTS

| | | | |
|---|---|---|---|
| 4,663,071 A | 5/1987 | Bush et al. | 252/174.19 |
| 5,549,852 A * | 8/1996 | Bell | 510/299 |
| 5,552,078 A | 9/1996 | Carr et al. | 510/351 |
| 5,733,857 A * | 3/1998 | Yamaguchi et al. | 510/361 |
| 5,993,666 A | 11/1999 | Yamaguchi et al. | 210/698 |
| 6,310,156 B1 | 10/2001 | Maeda et al. | |
| 6,444,771 B1 * | 9/2002 | Yamaguchi et al. | 526/317.1 |

FOREIGN PATENT DOCUMENTS

| | | | |
|---|---|---|---|
| CN | 1232053 A | 10/1999 | |
| EP | 0745662 | 12/1996 | |
| EP | 0747343 | 12/1996 | |
| EP | 0814193 | 12/1997 | |
| EP | 874008 * | 10/1998 | ........... C08F/22/02 |
| EP | 1101778 * | 5/2001 | ......... C08F/220/06 |
| JP | 59064613 | 4/1984 | |
| JP | 62270605 | 11/1987 | |
| JP | 314046 | 2/1991 | |
| JP | 5239114 | 9/1993 | |
| JP | 5247143 | 9/1993 | |
| JP | 2574144 | 10/1996 | |
| JP | 11035989 | 2/1999 | |
| JP | 11100592 | 4/1999 | |

* cited by examiner

Primary Examiner—Brian P. Mruk
(74) Attorney, Agent, or Firm—Roylance, Abrams, Berdo & Goodman, L.L.P.

(57) ABSTRACT

The present invention provides: a specific water-soluble polymer exhibiting a high calcium-ion-scavenging function and further exhibiting a high clay-dispersing function even in high-hardness water; a detergent composition comprising the water-soluble polymer; and uses, other than the detergent composition, by making the best use of the characteristics of the water-soluble polymer. The specific water-soluble polymer, according to the present invention, has a calcium ion scavengeability of not less than 0.40 and further has a clay dispersibility of not less than 0.50 in high-hardness water and, preferably, includes polymers A and B as essential components wherein the polymer A has a calcium ion scavengeability of not less than 0.45 and wherein the polymer B has a clay dispersibility of not less than 0.65 in high-hardness water. The detergent composition comprising this water-soluble polymer has a good detergency even in high-hardness water.

12 Claims, No Drawings

WATER-SOLUBLE POLYMER AND ITS USE

BACKGROUND OF THE INVENTION

A. Technical Field

The present invention relates to a water-soluble polymer and its uses such as detergent compositions, wherein the water-soluble polymer has specific functions, and wherein the detergent composition comprises the water-soluble polymer.

B. Background Art

A surfactant, particularly principally, an anionic surfactant, is used as a main component of detergents. When hardness components such as calcium ion and magnesium ion are present in water, the detergency of this anionic surfactant tends to greatly be deteriorated because the anionic surfactant forms salts with the above hardness components to become insoluble. Therefore, a polymer having high calcium ion scavengeability is added as a builder so that the above hardness components can be scavenged to enhance the detergency of the resultant detergent composition. In addition, when washing is carried out, a function to disperse mud dirt, namely, inorganic particles (clay), is remarkably exhibited as a recontamination inhibiting function upon white cloth, and such a function is very characteristic of water-soluble poly(carboxylic acid)-based polymers.

Polymers having many carboxyl groups, such as acrylic acid-based polymers and maleic acid/acrylic acid-based copolymers, which are among the above water-soluble polymers, have hitherto been known to have calcium-ion-scavenging and clay-dispersing functions. Various production processes for the acrylic acid-based polymers are disclosed in JP-A-270605/1987, JP-A-239114/1993 and so on, and those for the maleic acid/acrylic acid-based copolymers are disclosed in JP-A-247143/1993, JP-B-002167/1991, JP-B-014046/1991, Japanese Patent No. 2574144 and so on, wherein these documents teach contrivance for enhancing the above functions. In addition, in very various documents such as JP-A-035989/1999 besides the above-exemplified documents, it is disclosed that the above poly(carboxylic acid)-based polymers are preferable for detergent compositions by making the best use of characteristics of the poly(carboxylic acid)-based polymers having the above functions.

The maleic acid/acrylic acid-based copolymer has a very high calcium-ion-scavenging function, but its clay-dispersing function is hardly exhibited particularly under conditions where the hardness of water is high, although this clay-dispersing function is satisfactory under low-hardness conditions. On the other hand, the acrylic acid-based polymer has a clay-dispersing function even in high-hardness water, but its calcium-ion-scavenging function is very inferior. The general reason therefor is that, as the molecular weight of the polymer becomes higher, its calcium-ion-scavenging function becomes better, but its clay-dispersing function becomes worse, particularly, tends to become much worse in high-hardness water, and further that, as the molecular weight of the polymer becomes lower, its clay-dispersing function becomes better, but its calcium-ion-scavenging function tends to become worse. Therefore, there are problems of being caught in a dilemma such that if one ability is desired to become better, the other ability becomes worse.

Accordingly, for enhancing the detergency, particularly in high-hardness water, of the detergent composition, it is very important to simultaneously demand both performances of the function for scavenging the hardness components such as calcium ion and the function for dispersing the inorganic particles, and various contrivances have hitherto been made.

For example, as is exemplified by the above documents, attempts are made to improve such as molecular weight or production process of a certain polymer having a carboxyl group. However, as a result, the limit is the contrivance such that a polymer is designed to suppress one characteristic to a certain level and to make the best use of the other characteristic, or designed to well balance both performances, in other words, to set both performances to certain levels. Accordingly, it has not necessarily been possible to make the best use of both characteristics on high levels, therefore it has not necessarily been possible to say that the resultant detergent composition provides sufficient effects.

In addition, entirely separately from the above, a detergent composition comprising a combination of at least two specific polymers is disclosed in JP-A-100592/1999. However, this document has no disclosure about functions and effects of each of these polymers, which are to be combined with each other, with regard to both the above performances. Therefore, also as to the polymer mixture (i.e. polymer composition) obtained by combining the polymers with each other, it is impossible to say that the functions and effects with regard to both the above performances are enhanced, and the contrivance of simultaneously setting both performances onto high levels is not made. Accordingly, the detergency particularly in high-hardness water is not satisfactory as the detergent composition.

SUMMARY OF THE INVENTION

A. Object of the Invention

An object of the present invention is to provide: a specific water-soluble polymer exhibiting a high calcium-ion-scavenging function and further exhibiting a high clay-dispersing function even in high-hardness water; a detergent composition comprising the water-soluble polymer; and uses, other than the detergent composition, by making the best use of the characteristics of the water-soluble polymer.

B. Disclosure of the Invention

To solve the above problems, the present inventors diligently studied by considering that, in order for a detergent composition to have a very high detergency particularly in high-hardness water, it was particularly important to find a polymer having a high calcium-ion-scavenging function and further having a clay-dispersing function on a high level in high-hardness water. As a result, the inventors completed the present invention by finding that, if this polymer had physical properties such as a calcium ion scavengeability of not less than 0.40 and further a clay dispersibility of not less than 0.50 in high-hardness water, then it was, for example, very useful as a polymer for detergent compositions.

In addition, the inventors verified that such physical properties might be obtainable by only one kind of poly (carboxylic acid)-based polymer, that is, by one kind of poly(carboxylic acid)-based polymer alone, but was also obtainable, for example, by combining two kinds of polymers having specific functions different between these polymers, and that the polymer mixture obtained by combining the above two kinds of polymers had a high calcium-ion-scavenging function and further had a high clay-dispersing function even in high-hardness water, and further that a detergent composition comprising the above polymer alone and/or its mixture having the above specific physical properties had a very high detergency even in high-hardness water.

To solve the above problems, the present invention provides the following:

(1) A water-soluble polymer, which has a calcium ion scavengeability of not less than 0.40 and further has a clay dispersibility of not less than 0.50 in high-hardness water.

(2) A water-soluble polymer according to (1) above, which comprises a water-soluble poly(carboxylic acid)-based polymer having a structural unit derived from a monoethylenically unsaturated monocarboxylic acid (or salt) monomer and/or a structural unit derived from a monoethylenically unsaturated dicarboxylic acid (or salt) monomer.

(3) A water-soluble polymer according to (1) or (2) above, which comprises a polymer mixture including polymers A and B as essential components wherein the polymer A has a calcium ion scavengeability of not less than 0.45 and wherein the polymer B has a clay dispersibility of not less than 0.65 in high-hardness water, wherein the polymer mixture has physical properties such that the calcium ion scavengeability is not less than 0.40 and that the clay dispersibility is not less than 0.60 in high-hardness water.

(4) A water-soluble polymer according to (3) above, wherein the mixing ratio by weight of polymer A/polymer B is in the range of 20/80 to 95/5.

(5) A detergent composition, which comprises the water-soluble polymer as recited in any one of (1) to (4) above.

These and other objects and the advantages of the present invention will be more fully apparent from the following detailed disclosure.

DETAILED DESCRIPTION OF THE INVENTION

Hereinafter, a detail description of the present invention is given about: the specific water-soluble polymer exhibiting a high calcium-ion-scavenging function and further exhibiting a high clay-dispersing function even in high-hardness water; the detergent composition comprising the water-soluble polymer; and the uses, other than the detergent composition, by making the best use of the characteristics of the water-soluble polymer.

Specific Water-soluble Polymer

The specific water-soluble polymer according to the present invention is a single substance or a mixture, and has a calcium ion scavengeability of not less than 0.40 and further has a clay dispersibility of not less than 0.50 in high-hardness water. Preferable examples of the specific polymer having such physical properties include a water-soluble poly(carboxylic acid)-based polymer or its mixture having a structural unit derived from a monoethylenically unsaturated monocarboxylic acid (or salt) monomer and/or a structural unit derived from a monoethylenically unsaturated dicarboxylic acid (or salt) monomer.

Specific examples thereof include a water-soluble poly(carboxylic acid)-based polymer mixture including polymers A and B as essential components wherein the polymer A has a calcium ion scavengeability of not less than 0.45 and wherein the polymer B has a clay dispersibility of not less than 0.65 in high-hardness water. In this mixture, more preferably, the mixing ratio by weight of polymer A/polymer B is in the range of 20/80 to 95/5.

Incidentally, the definitions and measurement methods for the calcium ion scavengeability and the clay dispersibility in high-hardness water are described in the below-mentioned working example portion hereof.

In this way, for example, the water-soluble polymer having the specific physical properties, according to the present invention, can be obtained by a process including the step of mixing together the polymers A and B having physical properties different between these polymers. However, the process to obtain the water-soluble polymer according to the present invention is not especially limited by the mixing method.

As is mentioned above, a preferable example of the water-soluble polymer according to the present invention, which satisfies the above specific parameters, needs to include a water-soluble poly(carboxylic acid)-based polymer or its mixture having a structural unit derived from a monoethylenically unsaturated monocarboxylic acid (or salt) monomer and/or a structural unit derived from a monoethylenically unsaturated dicarboxylic acid (or salt) monomer. However, there is no especial limitation in the content (combining ratio) of the above water-soluble poly(carboxylic acid)-based polymer or its mixture in the water-soluble polymer according to the present invention if the physical properties of the entirety of this water-soluble polymer satisfies the above specific parameters.

The content of the above water-soluble poly(carboxylic acid)-based polymer or its mixture is preferably not less than 50 weight % (specifically, in the range of 50 to 100 weight %), more preferably not less than 70 weight % (specifically, in the range of 70 to 100 weight %), still more preferably not less than 80 weight % (specifically, in the range of 80 to 100 weight %), yet still more preferably not less than 90 weight % (specifically, in the range of 90 to 100 weight %), assuming that the entirety of the water-soluble polymer according to the present invention is 100 weight %.

In the case where the content (combining ratio) of the above water-soluble poly(carboxylic acid)-based polymer or its mixture in the water-soluble polymer according to the present invention is less than 50 weight %, there are disadvantages in that there is a possibility that either or both of parameters of the calcium ion scavengeability and the clay dispersibility in high-hardness water, as defined in the present invention, might not be satisfied. Therefore, it is difficult to give the detergency particularly in high-hardness water. Incidentally, components other than the above water-soluble poly(carboxylic acid)-based polymer and its mixture in the water-soluble polymer according to the present invention are not especially limited, but can be mixed in the above range in accordance with the purpose, if necessary.

Herein, a preferable embodiment of the water-soluble polymer according to the present invention comprises a polymer mixture including polymers A and B as essential components wherein the polymer A has a calcium ion scavengeability of not less than 0.45 and wherein the polymer B has a clay dispersibility of not less than 0.65 in high-hardness water and, more preferably, the mixing ratio by weight of polymer A/polymer B is in the range of 20/80 to 95/5.

In this embodiment, if the object to be combined is the above-corresponding polymer mixture including the polymers A and B as essential components, the total of the polymers A and B is regarded as the combining ratio (content) in the water-soluble polymer according to the present invention. In the water-soluble polymer according to the present invention, if the content is found on condition that the entirety of the water-soluble polymer according to the present invention which satisfies the specific parameter physical properties as defined in the present invention is 100 weight %, then the actual combining ratio (content) of the polymers A and B can be calculated in the above weight ratio.

For example, even as to a water-soluble polymer according to one of embodiments of the present invention which is obtained by comprising a polymer mixture including polymers A and B as essential components wherein the polymer A has a calcium ion scavengeability of not less than 0.45 and wherein the polymer B has a clay dispersibility of not less than 0.65 in high-hardness water, there is no especial limitation in the content (the content based on the entirety of the water-soluble polymer according to the present invention), which can be calculated from the total of the polymers A and B, if the entirety of the water-soluble polymer satisfies the above specific parameters as a result. However, the total content of the polymers A and B is preferably not less than 50 weight % (specifically, in the range of 50 to 100 weight %), more preferably not less than 70 weight % (specifically, in the range of 70 to 100 weight %), still more preferably not less than 80 weight % (specifically, in the range of 80 to 100 weight %), most preferably not less than 90 weight % (specifically, in the range of 90 to 100 weight %), assuming that the entirety of the water-soluble polymer according to the present invention is 100 weight %.

Incidentally, the content of the polymer or its mixture, which satisfies the present invention specific parameter physical properties, in the water-soluble polymer according to the present invention may be determined in accordance with physical properties desired for the resultant water-soluble polymer. As to such a content, the above content can preferably be adopted.

In addition, the above water-soluble poly(carboxylic acid)-based polymer or its mixture having a structural unit derived from a monoethylenically unsaturated monocarboxylic acid (or salt) monomer and/or a structural unit derived from a monoethylenically unsaturated dicarboxylic acid (or salt) monomer, which is contained in the water-soluble polymer according to the present invention that satisfies the above specific parameters, is more specifically obtainable by a process including the step of polymerizing monomer components including various monomers that are described herein and are raw materials for producing the definite polymer.

More specifically, a preferable mode to obtain the water-soluble polymer according to the present invention involves the use of a water-soluble poly(carboxylic acid)-based polymer or its mixture which has a structural unit derived from a monoethylenically unsaturated monocarboxylic acid (or salt) monomer and/or a structural unit derived from a monoethylenically unsaturated dicarboxylic acid (or salt) monomer and is obtained by a process including the step of polymerizing monomer components including various monomers which are described herein and are raw materials for producing the definite water-soluble poly(carboxylic acid)-based polymer.

Hereinafter, the essential features of the specific water-soluble polymer according to the present invention are described specifically in more detail.

Physical Properties of Water-soluble Polymer

The physical properties of the specific water-soluble polymer according to the present invention is as follows: the calcium ion scavengeability is not less than 0.40 and the clay dispersibility is not less than 0.50 in high-hardness water and, preferably, the calcium ion scavengeability is not less than 0.40 and the clay dispersibility is not less than 0.60 in high-hardness water.

Because the water-soluble polymer satisfies both parameters of the calcium ion scavengeability and the clay dispersibility in high-hardness water, the detergent composition which comprises this water-soluble polymer, for example, displays a very excellent detergency even in high-hardness water, needless to say low-hardness water. In the case where the calcium ion scavengeability is less than 0.40, there are disadvantages in that scavenging the hardness components such as calcium might be so insufficient that, as is mentioned above, the surfactant might become insoluble particularly in high-hardness water to deteriorate the detergency. In addition, in the case where the clay dispersibility is less than 0.50 in high-hardness water, there are disadvantages in that the function to disperse mud dirt (inorganic particles) might be so insufficient as to deteriorate the recontamination inhibitability for white cloth.

Water-soluble Poly(Carboxylic Acid)-based Polymer

The water-soluble poly(carboxylic acid)-based polymer in the present invention is a water-soluble polymer having a structural unit derived from a monoethylenically unsaturated monocarboxylic acid (or salt) monomer and/or a structural unit derived from a monoethylenically unsaturated dicarboxylic acid (or salt) monomer.

Specific examples of the monoethylenically unsaturated monocarboxylic acid (or salt) monomer include acrylic acid (or salts), methacrylic acid (or salts), crotonic acid (or salts) and α-hydroxyacrylic acid (or salts). These monomers may be used either alone respectively or in combinations with each other. Particularly preferable among these are acrylic acid (or salts), methacrylic acid (or salts), and their mixtures.

Herein, the word "(salt)" means being permitted to be any of an acid type, a partial salt type, a perfect salt type and their mixtures in the present invention. Hereinafter, these are referred to simply as (salt). Examples of the salt include: salts of alkaline metals such as sodium and potassium; salts of alkaline earth metals such as calcium and magnesium; ammonium salts; and salts of organic amines such as monoethanolamine and triethanolamine. These salts may be used either alone respectively or in combinations with each other. When the monomer is used in salt form, the salts of alkaline metals such as sodium and potassium are preferable, and sodium salts are particularly preferable.

Specific examples of the monoethylenically unsaturated dicarboxylic acid (or salt) monomer include maleic acid (or salts), fumaric acid (or salts), itaconic acid (or salts), citraconic acid (or salts), and, if any, their anhydrides. These may be used either alone respectively or in combinations with each other. Particularly preferable among these are maleic acid (or salts), maleic anhydride, fumaric acid (or salts), and their mixtures.

In addition, if necessary, the water-soluble polymer according to the present invention may further have a structural unit derived from a sulfonic-acid-(or salt)-group-containing monoethylenic monomer (or its salt) and, according to circumstances, may still further have a structural unit derived from another copolymerizable monoethylenically unsaturated monomer such as contains a hydroxyl group. According to circumstances, the introduction of the sulfonic acid group might achieve one of the objects of the present invention, that is to say, very greatly enhance the clay dispersibility in high-hardness water.

Examples of the sulfonic-acid-(or salt)-group-containing monoethylenic monomer (or its salt) include vinylsulfonic acid (or salts), allylsulfonic acid (or salts), methallylsulfonic acid (or salts), sulfoethyl acrylate, sulfoethyl methacrylate, sulfopropyl acrylate, sulfopropyl methacrylate, 3-allyloxy-2-hydroxypropanesulfonic acid (or salts), styrenesulfonic acid (or salts), 2-acrylamido-2-methylpropanesulfonic acid (or salts), and 2-hydroxy-3-butenesulfonic acid (or salts). These may be used either alone respectively or in combinations with each other. Preferable are 3-allyloxy-2-hydroxypropanesulfonic acid (or salts), sulfoethyl acrylate, sulfoethyl methacrylate, and 2-hydroxy-3-butenesulfonic acid (or salts).

In addition, the weight-average molecular weight of the water-soluble polymer according to the present invention is not especially limited, but is preferably in the range of 500 to 200,000, more preferably 1,000 to 100,000, still more preferably 2,000 to 80,000. In the case where the weight-average molecular weight is less than 500, there are disadvantages in that the calcium ion scavengeability might greatly be deteriorated. In addition, in the case where the weight-average molecular weight is more than 200,000, there are disadvantages in that the clay dispersibility in high-hardness water might greatly be deteriorated. Furthermore, the measurement method for the weight-average molecular weight is described in the working example portion hereof.

An embodiment of the water-soluble polymer according to the present invention may be a mixture comprising at least two kinds of polymers obtained by their respective separate production processes, needless to say so-called one substance obtained by one production process.

Specific examples of the mixture comprising at least two kinds of polymers include a polymer mixture including polymers A and B as essential components wherein the polymer A has a calcium ion scavengeability of not less than 0.45 and wherein the polymer B has a clay dispersibility of not less than 0.65 in high-hardness water, and preferably, the mixing ratio by weight of polymer A/polymer B is in the range of 20/80 to 95/5. The polymer mixture, as exemplified hereupon, is hereinafter referred to as specific polymer mixture in the present invention, and is described in detail below.

Specific Polymer Mixture in the Present Invention

The specific polymer mixture in the present invention includes polymers A and B as essential components wherein the polymer A has a calcium ion scavengeability of not less than 0.45 and wherein the polymer B has a clay dispersibility of not less than 0.65 in high-hardness water.

This polymer mixture enables to attain an essential object of the present invention, that is, to obtain a water-soluble polymer having a calcium ion scavengeability of not less than 0.40 and further having a clay dispersibility of not less than 0.50 in high-hardness water, preferably, having a calcium ion scavengeability of not less than 0.40 and further having a clay dispersibility of not less than 0.60 in high-hardness water.

There is no especial limitation in the combining ratio between the above polymers A and B if the above specific parameters are satisfied, but the combining ratio by weight of polymer A/polymer B is preferably in the range of 20/80 to 95/5, more preferably 30/70 to 90/10. In the case where the combining ratio is outside the above range, there are disadvantages in that both parameters of the calcium ion scavengeability and the clay dispersibility in high-hardness water might not be satisfied.

Next, an explanation is given about the polymers A and B which are essential components of the polymer mixture according to the present invention.

<Polymer A>

The polymer A, which is an essential component of the polymer mixture according to the present invention, is a polymer having physical properties such as a calcium ion scavengeability of not less than 0.45, preferably not less than 0.47, more preferably not less than 0.49, and thus has a very high calcium ion scavengeability. There is no especial limitation in the polymer A if the polymer A satisfies the above parameter, but the polymer A is preferably the below-mentioned water-soluble poly(carboxylic acid)-based polymer.

Examples of the above water-soluble poly(carboxylic acid)-based polymer, which satisfies the above calcium ion scavengeability, include maleic acid(-based) polymers (or their salts), fumaric acid(-based) polymers (or their salts), acrylic acid/maleic acid(-based) copolymers (or their salts), methacrylic acid/maleic acid(-based) copolymers (or their salts), acrylic acid/fumaric acid(-based) copolymers (or their salts), and methacrylic acid/fumaric acid(-based) copolymers (or their salts). These may be used either alone respectively or in combinations with each other. Particularly preferable among these polymers are the acrylic acid/maleic acid(-based) copolymers (or their salts) and the acrylic acid/fumaric acid(-based) copolymers (or their salts). In addition, the composition ratio of the copolymer is not limited, but is preferably in the range of 10/90 to 90/10, more preferably 20/80 to 80/20, in molar ratio.

The weight-average molecular weight of these polymers is not especially limited, but is preferably in the range of 1,000 to 200,000, more preferably 3,000 to 100,000. In the case where the weight-average molecular weight is less than 1,000, there are disadvantages in that the calcium ion scavengeability might greatly be deteriorated. In addition, in the case where the weight-average molecular weight is more than 200,000, there are disadvantages as follows: there is, for example, a problem of water solubility in uses for detergent compositions and, even if a polymer having a weight-average molecular weight more than 200,000 has water solubility, its dissolution rate might be too slow to obtain sufficient effects. Herein, the word "(-based)" in the present invention means, for example, as follows: the maleic acid(-based) polymer is a polymer in which the content of the structural unit derived from maleic acid is not less than 90 mol %, and in which the content of structural units derived from other copolymerizable monomers is less than 10 mol %; and the maleic acid/acrylic acid(-based) copolymer is a polymer in which the total content of the structural units derived from maleic acid and acrylic acid respectively is not less than 90 mol %, and in which the content of structural units derived from other copolymerizable monomers is less than 10 mol %. Hereinafter, these are referred to simply as (-based). There is no especial limitation in the other copolymerizable monomers unless they do damage to the above physical properties of the polymer A. However, water-soluble monoethylenic monomers are preferable, and carboxyl-group-containing monomers, sulfonic-acid-group-containing monomers and hydroxyl-group-containing monomers are particularly preferable.

In addition, the content of the structural units of the other copolymerizable monomers in the above polymer is preferably less than 10 mol %, more preferably less than 5 mol %, still more preferably less than 3 mol %, and most preferably, none of such structural units is contained in the above polymer.

In short, the content of the structural units of the other copolymerizable monomers in the above polymer in the present invention is preferably in the range of 0 to 10 mol % (but not including 10 mol %), more preferably 0 to 5 mol % (but not including 5 mol %), still more preferably 0 to 3 mol % (but not including 3 mol %).

Therefore, particularly preferable examples of the polymer A include acrylic acid/maleic acid(-based) copolymers (or their salts), acrylic acid/fumaric acid(-based) copolymers (or their salts), and their mixtures, which have a weight-average molecular weight of 3,000 to 100,000 and a composition ratio of 20/80 to 80/20 in molar ratio. If they are salts, examples thereof include sodium salts and potassium salts. The most preferable examples of the polymer A include the above acrylic acid/maleic acid copolymers (or their salts) and the above acrylic acid/fumaric acid copolymers (or their salts), which include no other components. If they are salts, examples thereof include sodium salts and potassium salts.

In addition, the production process for the polymer A is not especially limited, but the polymer A may be produced by conventional processes. When the above particularly preferable examples such as acrylic acid/maleic acid copolymers (or their salts) are produced, uniform polymerization by stirring in an aqueous solvent is preferable.

<Polymer B>

The polymer B, which is another essential component of the polymer mixture according to the present invention, is a polymer having physical properties such as a clay dispersibility of not less than 0.65, preferably not less than 0.70, still more preferably not less than 0.75, in high-hardness water, and thus has a very high clay dispersibility even in high-hardness water. There is no especial limitation in the polymer B if the polymer B satisfies the above parameter, but the polymer B is preferably the below-mentioned water-soluble poly(carboxylic acid)-based polymer.

Examples of the above water-soluble poly(carboxylic acid)-based polymer, which satisfies the above clay dispersibility in high-hardness water, include acrylic acid(-based) polymers (or their salts), methacrylic acid(-based) polymers (or their salts), a-hydroxyacrylic acid(-based) polymers (or their salts), acrylic acid/sulfonic-acid-group-containing monomer(-based) copolymers (or their salts), methacrylic acid/sulfonic-acid-group-containing monomer(-based) copolymers (or their salts), acrylic acid/hydroxyl-group-containing monomer(-based) copolymers (or their salts), and methacrylic acid/hydroxyl-group-containing monomer(-based) copolymers (or their salts). These may be used either alone respectively or in combinations with each other. Particularly preferable among these polymers are the acrylic acid(-based) polymers (or their salts) and the acrylic acid/sulfonic-acid-group-containing monomer(-based) copolymers (or their salts). In addition, the content of the structural unit derived from the sulfonic-acid-group-containing monomer is preferably in the range of 5 to 50 mol %, more preferably 10 to 30 mol %.

Examples of the sulfonic-acid-group-containing monomer include vinylsulfonic acid (or salts), allylsulfonic acid (or salts), methallylsulfonic acid (or salts), sulfoethyl acrylate, sulfoethyl methacrylate, sulfopropyl acrylate, sulfopropyl methacrylate, 3-allyloxy-2-hydroxypropanesulfonic acid (or salts), styrenesulfonic acid (or salts), 2-acrylamido-2-methylpropanesulfonic acid (or salts), and 2-hydroxy-3-butenesulfonic acid (or salts). These may be used either alone respectively or in combinations with each other. Preferable are 3-allyloxy-2-hydroxypropanesulfonic acid (or salts), sulfoethyl acrylate, sulfoethyl methacrylate, and 2-hydroxy-3-butenesulfonic acid (or salts).

The weight-average molecular weight of these polymers is not especially limited, but is preferably in the range of 1,000 to 100,000, more preferably 1,000 to 10,000. In the case where the weight-average molecular 0 weight is outside these ranges, there are disadvantages in that the clay dispersibility in high-hardness water might greatly be deteriorated.

Therefore, particularly preferable examples of the polymer B include acrylic acid(-based) polymers (or their salts), acrylic acid/sulfonic-acid-group-containing monomer(-based) copolymers (or their salts), and their mixtures, which have a weight-average molecular weight of 1,000 to 10,000. When the sulfonic-acid-group-containing monomer is used, preferable examples thereof include 3-allyloxy-2-hydroxypropanesulfonic acid (or salts), sulfoethyl acrylate, sulfoethyl methacrylate, and 2-hydroxy-3-butenesulfonic acid (or salts), and the content of the structural units derived from these monomers is preferably in the range of 10 to 30 mol %. In addition, if they are salts, examples thereof include sodium salts and potassium salts. The most preferable examples of the polymer B include the above acrylic acid polymers (or their salts), the above acrylic acid/sulfonic-acid-group-containing monomer copolymers (or their salts), and their mixtures, which include no other components. When the sulfonic-acid-group-containing monomer is used, preferable examples thereof include 3-allyloxy-2-hydroxypropanesulfonic acid (or salts), sulfoethyl acrylate, sulfoethyl methacrylate, and 2-hydroxy-3-butenesulfonic acid (or salts), and the content of the structural units derived from these monomers is preferably in the range of 10 to 30 mol %. In addition, if they are salts, examples thereof include sodium salts and potassium salts.

In addition, similarly to the production process for the polymer A, the production process for the polymer B is not especially limited, but the polymer B may be produced by conventional processes. When the above particularly preferable examples such as acrylic acid polymers (or their salts) and acrylic acid/sulfonic-acid-group-containing monomer copolymers (or their salts) are produced, uniform polymerization by stirring in an aqueous solvent is preferable.

<Production Process for Specific Water-soluble Polymer>

Next, a detailed explanation is given about the production process for the specific water-soluble polymer according to the present invention.

The production process for the specific water-soluble polymer having a calcium ion scavengeability of not less than (0.40 and further having a clay dispersibility of not less than 0.50 in high-hardness water in the present invention is not especially limited, but, specifically, preferable examples thereof include a production process which comprises the steps of: mixing polymers A and B together in a mixing ratio by weight of polymer A/polymer B=20/80 to 95/5 to obtain a polymer mixture wherein the polymer A has a calcium ion scavengeability of not less than 0.45 and wherein the polymer B has a clay dispersibility of not less than 0.65 in high-hardness water; and then arranging the polymer mixture such that the polymer mixture can comprise not less than 50 weight % of the water-soluble polymer.

Herein, the polymers A and B are as aforementioned. In addition, the mixing ratio between the polymers A and B is also as aforementioned: polymer A/polymer B=preferably 20/80 to 95/5, more preferably 30/70 to 90/10, in ratio by weight. Furthermore, the combining ratio of the polymer mixture in the specific water-soluble polymer according to the present invention is also as aforementioned: preferably not less than 50 weight %, more preferably not less than 80 weight %, still more preferably not less than 90 weight %, in total of the polymers A and B.

Next, hereupon, an explanation is given about a method for mixing the polymers A and B in the above production process. The method for mixing the polymers A and B is not especially limited, examples thereof include the following:

(1) The polymers A and B are both beforehand produced, and then mixed together so that the ratio between these polymers will be a desired one.

(2) One of the polymers is beforehand produced, and then added to a system in which the other polymer is being produced so that the ratio between these polymers will be a desired one, thus producing a mixture.

(3) One of the polymers is produced and, subsequently, the other polymer is produced so that the ratio between these polymers will be a desired one, thus producing a mixture.

Of these methods, the method (1) is preferable in respect to ease of polymer mixture designing and to quality stability. Next, the above methods (1) to (3) are explained in more detail.

Specific examples of the method (1) include: solution-solution mixing to mix both polymers in a solution state; powder-powder mixing to mix both polymers in a powdery state; and solution-powder mixing to mix one polymer in a solution state and the other polymer in a powdery state. A mixture solution which is uniform as a whole is obtained by stirring in both cases of the solution-solution mixing and the solution-powder mixing, both of which result in a solution state. As to the powder-powder mixing which results in a powdery state, it is necessary, for obtaining an overall uniform mixture, that both polymers are sufficiently mixed together by stirring, preferably, in finely pulverized powder form. In the case where the resultant mixture is not uniform as a whole, in other words, where mixture components are biased, there are disadvantages in that specific portions having biases might not satisfy the specific functions, as defined in the present invention, such that the calcium ion scavengeability is not less than 0.40 and that the clay dispersibility is not less than 0.50 in high-hardness water.

In addition, in this method, it is necessary that the polymers A and B are beforehand produced. As is aforementioned, however, the production processes for these polymers are not especially limited, but preferably involve the uniform polymerization by stirring in an aqueous solvent. In addition, the powdering method, which is carried out when either or both of polymers are used in a powdery state, is not especially limited, and the polymer or polymers may be pulverized by conventional methods. Incidentally, herein, the words "powdery state" is used in broad meanings and include all of states such as so-called powdery, granular, pelletized, and further, according to circumstances, pasty, and gelled states.

The above methods give an overall uniform mixture in a solution state or powdery state. Needless to say, the state of the resultant mixture may be adjusted to a state according to the object. A mixture obtained in a solution state may be powdered according to circumstances. Even a mixture obtained in a powdery state may be converted into a solution and then used, according to circumstances.

Next, the method (2) is explained. In this method, while one polymer is produced, the other polymer as beforehand produced is added thereto so that the ratio between these polymers will be a desired one, thus obtaining a mixture. The production processes for the polymers are as aforementioned. The method for adding the beforehand produced polymer is not especially limited, but this polymer may be added any time of the following: in the initial stage of polymerization, or in the course of polymerization, or just before the end of polymerization; and any of all-at-once addition, intermittent addition, and continuous addition is permissible, and further, either uniform or non-uniform addition is permissible. Furthermore, the polymer may be added either in a solution state or powdery state. The method for the addition may fitly be set according to the need and purpose. However, it is nothing but the above method (1) that the beforehand produced polymer is added after the polymerization has substantially been completed.

Furthermore, the method (3) is explained. In this method, one of the polymers is produced and, subsequently, the other polymer is produced so that the ratio between these polymers will be a desired one. This method is a modification of the above method (2) in which the beforehand produced polymer is added all at once in the initial stage of the production of the other polymer. The difference from the method (2) is that, before the production of one polymer has been completed, the production of the other polymer is initiated. Thus, the present method (3) has a factor like continuous polymerization in a sense. This method like continuous polymerization in a sense may be carried out either in an identical reactor or continuously in at least two reactors.

<Detergent Composition Comprising Specific Water-soluble Polymer>

Next, an explanation is made about the detergent composition comprising the specific water-soluble polymer wherein the provision of this detergent composition is yet another object of the present invention.

The detergent composition, according to the present invention, comprises the above water-soluble polymer, namely, the water-soluble polymer having a calcium ion scavengeability of not less than 0.40 and further having a clay dispersibility of not less than 0.50 in high-hardness water, preferably, having a calcium ion scavengeability of not less than 0.40 and further having a clay dispersibility of not less than 0.60 in high-hardness water, wherein an embodiment of the water-soluble polymer includes polymers A and B as essential components wherein the polymer A has a calcium ion scavengeability of not less than 0.45 and wherein the polymer B has a clay dispersibility of not less than 0.65 in high-hardness water.

As to the detergent composition according to the present invention, it is preferable that: the combining ratio of the water-soluble polymer, in other words, the content of the water-soluble polymer according to the present invention, assuming the detergent composition to be 100 weight %, is in the range of 1 to 20 weight % of the entirety of the detergent composition, and the combining ratio of the surfactant is in the range of 5 to 70 weight % of the entirety of the detergent composition. An enzyme may be added in the range of not more than 5 weight % according to circumstances.

In the case where the combining ratio of the water-soluble polymer is less than 1 weight %, the effect of the addition is not displayed. In the case where the combining ratio is more than 20 weight %, there are economical disadvantages in that the effect of the addition does not lead to the enhancement of the detergency any longer. Furthermore, in the case where the amount of the surfactant, which is a main agent of the detergent composition, is out of the above range, there are disadvantages in that the balance between the surfactant and other components might be broken to give a bad effect upon the detergency of the detergent composition. In the case where the enzyme is added, the enzyme contributes toward enhancing the detergency. However, in the case where the combining ratio of the enzyme is more than 5 weight %, there are economical disadvantages in that the effect of the addition is not displayed any longer.

The usable surfactant is at least one member selected from the group consisting of anionic surfactants, nonionic surfactants, amphoteric surfactants and cationic surfactants. The anionic surfactant is not especially limited, but examples thereof include alkylbenzenesulfonate salts, alkyl or alkenyl ether sulfate salts, alkyl or alkenyl sulfate salts, α-olefinsulfonate salts, α-sulfofatty acids or ester salts thereof, alkanesulfonate salts, saturated or unsaturated fatty acid salts, alkyl or alkenyl ether carboxylate salts, amino acid type surfactants, N-acylamino acid type surfactants, and alkyl or alkenyl phosphate esters or salts thereof.

The nonionic surfactant is not especially limited, but examples thereof include polyoxyalkylene alkyl or alkenyl ethers, polyoxyethylene alkyl phenyl ethers, higher fatty acid alkanolamides or alkylene oxide adducts thereof, sucrose fatty acid esters, alkyl glycoxides, fatty acid glycerol monoesters, and alkylamine oxides.

The amphoteric surfactant is not especially limited, but examples thereof include carboxy type or sulfobetaine type amphoteric surfactants. The cationic surfactant is not especially limited, but examples thereof include quaternary ammonium salts.

Usable examples of the enzyme, which may be combined into the detergent composition according to the present invention, include protease, lipase and cellulase. Particularly, protease, alkali lipase and alkali cellulase are preferable because these exhibits high activity in alkali washing liquids.

If necessary, the detergent composition according to the present invention may further comprise components conventionally used for detergent compositions, such as conventional alkaline builders, chelate builders, re-attachment inhibitors, soil-release agents, dye migration inhibitors, softening agents, fluorescent agents, bleachers, cobleachers and perfumes. In addition, zeolite may be added.

Usable examples of the alkaline builder include silicate salts, carbonate salts and sulfate salts. Examples of the chelate builder, usable if necessary, include diglycolic acid, oxycarboxylate salts, EDTA (ethylenediaminetetraacetic acid), DTPA (diethylenetriaminehexaacetic acid) and citric acid. Or conventional water-soluble poly(carboxylic acid)-based polymers may be used within the range not damaging the effects of the present invention.

<Other Uses of Specific Water-soluble Polymer>

Finally, an explanation is made about the uses, other than the detergent composition, by making the best use of the characteristics of the specific water-soluble polymer according to the present invention wherein the provision of such uses is yet another object of the present invention. Namely, the specific water-soluble polymer according to the present invention can be utilized for uses such as inorganic-pigment dispersants, water-treating agents, and fiber-treating agents. Hereinafter, their preferable embodiments are described.

Inorganic-pigment Dispersant

The inorganic-pigment dispersant, comprising the above water-soluble polymer, preferably consists of the water-soluble polymer according to the present invention and, if necessary, may further contain other additives such as condensed phosphoric acid and any salt thereof, phosphonic acid and any salt thereof, and poly(vinyl alcohol).

The content of the water-soluble polymer according to the present invention in the inorganic-pigment dispersant according to the present invention is not especially limited, but is preferably in the range of 5 to 100 weight %. In addition, the inorganic-pigment dispersant may further comprise conventional water-soluble polymers within the range not giving any influence upon performances or effects.

In any case, this dispersant exhibits good performance as a dispersant for inorganic pigments such as heavy or light calcium carbonate (as used for paper coating) and clay. For example, if a small amount of the inorganic-pigment dispersant according to the present invention is added to an inorganic pigment and then dispersed into water along with the pigment, then high concentration inorganic pigment slurries such as high concentration calcium carbonate slurries can be produced wherein the high concentration inorganic pigment slurries have a low viscosity and a high fluidity, and further, a good stability of these properties over a period of time.

The amount of the inorganic-pigment dispersant according to the present invention, as used, is preferably in the range of 0.05 to 2.0 weight parts per 100 weight parts of the inorganic pigment. In the case where the amount is smaller than 0.05 weight parts, a sufficient dispersing effect cannot be obtained. On the other hand, in the case where the amount is larger than 2.0 weight parts, there might be economical disadvantages in that an effect rewarding the amount of the addition is not obtained any longer.

Water-treating Agent

The water-treating agent, comprising the above water-soluble polymer, preferably consists of the water-soluble polymer according to the present invention and, if necessary, may further contain other additives such as polymerized phosphate salts, phosphonate salts, anticorrosive agents, slime controlling agents, and chelating agents. In any case, this water-treating agent is useful for inhibiting the formation of scale in systems such as cooling water circulation systems, boiler water circulation systems, seawater desalination plants, pulp digesters, and black liquor evaporators. In addition, the water-treating agent may further comprise conventional water-soluble polymers within the range not giving any influence upon performances or effects.

Fiber-treating Agent

The fiber-treating agent, comprising the above water-soluble polymer, comprises: at least one member selected from the group consisting of dyeing agents, peroxides and surfactants; and the above water-soluble polymer according to the present invention. The content of the water-soluble polymer according to the present invention in the fiber-treating agent according to the present invention is not especially limited, but is preferably in the range of 1 to 100 weight %, more preferably 5 to 100 weight %. The fiber-treating agent may further comprise conventional water-soluble polymers within the range not giving any influence upon performances or effects. However, a more preferable embodiment of the fiber-treating agent in view of the physical properties is such that the polymer component in the fiber-treating agent consists of the water-soluble polymer according to the present invention.

Hereinafter, blending examples of the fiber-treating agent according to the present invention are shown in the form more closer to modes for carrying out the present invention.

This fiber-treating agent can be used in the steps, such as scouring, dyeing, bleaching, and soaping steps, in the treatment process for fibers. Examples of the dyeing agents, peroxides, and surfactants include those which are conventionally used for fiber-treating agents.

The combining ratio between the above water-soluble polymer and the above at least one member selected from the group consisting of dyeing agents, peroxides, and surfactants is as follows: for example, for improving fibers with regard to the whiteness degree, the color evenness, and the degree of dyed colorfastness, it is preferable to use as the fiber-treating agent a composition which contains the at least one member selected from the group consisting of dyeing agents, peroxides, and surfactants in a ratio of 0.1 to 100 weight parts per 1 weight part of the water-soluble polymer according to the present invention in terms of pure components of the fiber-treating agent.

For example, an aqueous solution state with a definite concentration of the fiber-treating agent having the above combining ratio in terms of pure components is one of preferred embodiments of the fiber-treating agent according to the present invention. The above definite concentration can be determined according to the use form or purpose, and is not especially limited.

The fiber for which the fiber-treating agent according to the present invention can be used is not especially limited, but examples thereof include: cellulose fibers such as cotton and hemp; chemical fibers such as nylon and polyester; animal fibers such as wool and silk; semisynthetic fibers such as rayon; and any fabric and blend thereof.

In the case where the fiber-treating agent according to the present invention is applied to the scouring step, it is preferable that the water-soluble polymer according to the present invention is mixed with alkali agents and surfactants. For the bleaching step, it is preferable that the water-soluble polymer according to the present invention is mixed with peroxides and with silicic chemicals, which are used as decomposition inhibitors for alkaline bleachers, such as sodium silicate.

Effects and Advantages of the Invention

As is mentioned above, the present invention has enabled to obtain a water-soluble polymer which has never been obtained before, namely, a water-soluble polymer which is very excellent with regard to both the calcium ion scavengeability and the clay dispersibility in high-hardness water, wherein an embodiment of this water-soluble polymer is a water-soluble polymer comprising a polymer mixture in a ratio of not less than 50 weight % wherein the polymer mixture is obtained by a process including the step of mixing polymers A and B together as essential components in a specific ratio, namely, in a mixing ratio by weight of polymer A/polymer B=20/80 to 95/5, wherein the polymer A has a calcium ion scavengeability of not less than 0.45 and wherein the polymer B has a clay dispersibility of not less than 0.65 in high-hardness water.

Therefore, the detergent composition according to the present invention, which comprises the above water-soluble polymer having a calcium ion scavengeability of not less than 0.40 and further having a clay dispersibility of not less than 0.50 in high-hardness water, displays a very excellent detergency even in high-hardness water, needless to say low-hardness water.

Incidentally, the high-hardness water in the present invention is water that is prepared under definite conditions as described in the working example portion hereof, namely, water that is obtained by a preparation process under definite conditions in such as a test tube using 0.3 g of clay of 8 types of JIS test dust I (Kanto loam, fine particles; available from Japan Powder Industrial Technical Society) so as to have a calcium ion concentration of 200 ppm in terms of calcium carbonate.

Similarly, the water-soluble polymer has been found to be excellent also as an inorganic-pigment dispersant, a water-treating agent, and a fiber-treating agent.

DETAILED DESCRIPTION OF THE PREFERRED EMBODIMENTS

Hereinafter, the present invention is more specifically illustrated by the following examples of some preferred embodiments in comparison with comparative examples not according to the invention. However, the invention is not limited thereto. Incidentally, the unit "%" denotes "weight %".

Measurement Method for Physical Properties

Described to begin with are measurement methods for the calcium ion scavengeability and the clay dispersibility in high-hardness water which are fundamental important parameters in the present invention. In addition, the weight-average molecular weight of the polymer as used was measured for reference, therefore a measurement method for the weight-average molecular weight is also described together.

<Calcium Ion Scavengeability>

(1) First, calcium ion standard solutions for drawing a calibration curve were prepared by the following steps of preparing 50 g each of aqueous solutions of 0.01 mol/l, 0.001 mol/l, and 0.0001 mol/l respectively by use of calcium chloride dihydrate, and then adjusting their pH into the range of 9 to 11 with an aqueous NaOH solution of 4.8%, and then adding thereto 1 ml of an aqueous potassium chloride solution of 4 mol/l (hereinafter, abbreviated as "aqueous 4M-KCl solution"), and then sufficiently stirring the resultant mixture with a magnetic stirrer, thus preparing the sample solutions for drawing the calibration curve. In addition, a needed amount (50 g per sample) of aqueous solution of 0.0012 mol/l was prepared as a test calcium ion standard solution similarly by the use of calcium chloride dihydrate.

(2) Next, 10 mg (in terms of solid content) of a test sample (polymer) was weighed out into a beaker of 100 cc, and thereto 50 g of the test calcium ion standard solution prepared in step (1) above was added, and then the contents of the beaker were stirred with a magnetic stirrer enough. Furthermore, similarly to the sample solutions for drawing the calibration curve, the pH of the resultant mixture was adjusted into the range of 9 to 11 with an aqueous NaOH solution of 4.8%, and then thereto 1 ml of the aqueous 4M-KCl solution was added, thus preparing a test sample solution.

(3) The sample solutions for drawing the calibration curve and the test sample solution, as prepared in the above ways, were measured with a calcium ion electrode 93–20 (made by OLION Co.) using an ion analyzer EA920 (made by OLION Co.).

(4) The amount of calcium ion, as scavenged by the sample (polymer), was determined by calculation from the calibration curve and the measured value of the test sample solution. Then, the determined amount per g of the solid content of the polymer was denoted by the grams in terms of calcium carbonate, and its value was regarded as the calcium ion scavengeability value.

<Clay Dispersibility in High-hardness Water>

(1) First, a glycine buffer was prepared by adding ion-exchanged water to 67.56 g of glycine, 52.6 g of sodium chloride, and 60 ml of aqueous NaOH solution of 1 mol/l to adjust the total weight to 600 g.

(2) A dispersion was prepared by weighing out 0.3268 g of calcium chloride dihydrate and 60 g of the glycine buffer, as prepared in step (1) above, and adding thereto pure water to adjust the total weight to 1,000 g. In addition, a aqueous polymer solution of 0.1% in terms of solid content was prepared.

(3) Next, 0.3 g of clay of 8 types of JIS test dust I (Kanto loam, fine particles; available from Japan Powder Industrial Technical Society) was placed into a general test tube of about 30 cc as used for experiments. Thereto, 27 g of the dispersion and 3 g of the aqueous polymer solution, as prepared in step (2) above, were added, thus obtaining a test liquid, of which the calcium concentration was 200 ppm in terms of calcium carbonate.

(4) The test tube was sealed with P (trade mark, polypropylene based film made by American National Can), and then shaken gently so that the clay would be dispersed into the entirety of the test liquid. Thereafter, the test tube was further shaken up and down 20 times. The test tube was then allowed to stand stationary for 20 hours in a place as not exposed to direct sunlight. Thereafter, 5 ml of supernatant of the dispersion was sampled with a whole pipet.

(5) The absorbance (ABS) of the sampled liquid was measured with a cell of 1 cm under conditions of wave length=380 nm using a UV spectroscope, and the resultant value was regarded as the clay dispersibility value in high-hardness water.

<Measurement Method for Weight-average Molecular Weight (Mw)>

(1) The weight-average molecular weight was measured by GPC (gel permeation chromatography). The column as used for the measurement was G-3000PWXL (made by TOSOH Corporation). The moving phase thereof was an aqueous solution as prepared by adding pure water to 34.5 g of disodium hydrogenphosphate dodecahydrate and 46.2 g of sodium dihydrogenphosphate dihydrate (both of which were special grade reagents; hereinafter, the reagents as used for the measurement were all special-grade ones) to adjust the entirety to 5,000 g, and then filtering the resultant mixture through a membrane filter of 0.45 μm.

(2) The pump as used was L-7110 (made by Hitachi Co., Ltd.). The flow rate of the moving phase was adjusted to 0.5 ml/min. The detector was used at a UV wavelength of 214 nm (Model 481 made by Nippon Waters Co., Ltd.). Then, the column temperature was kept constant at 35° C.

(3) A calibration curve was drawn with poly(sodium acrylate) standard samples (made by Sowa Kagaku Co.). The weight-average molecular weight of the polymer was measured using this calibration curve.

REFERENTIAL EXAMPLES

In the Referential Examples below, production processes were carried out to obtain the following components of the water-soluble polymer according to the present invention: polymers A1 and A2 as the polymers A having a calcium ion scavengeability of not less than 0.45; and polymer B1 as the polymer B having a clay dispersibility of not less than 0.65 in high-hardness water.

Referential Example 1

The polymer A1, which was a maleic acid/acrylic acid copolymer with a molar ratio of 50/50, was produced as the polymer A.

Namely, 132.8 g of ion-exchanged water (hereinafter, referred to as pure water), 400 g of aqueous sodium hydroxide solution of 48% (hereinafter, referred to as 48% NaOH) and 235.2 g of maleic anhydride (hereinafter, referred to as anhydrous MA) were initially charged into a SUS-made separable flask of 2.5 liters in capacity as fitted with a thermometer, a stirrer and a reflux condenser. The resultant aqueous solution was heated so as to fall into a boiling point reflux state while being stirred. Thereafter, while the reflux state was maintained under stirred conditions, the following materials were dropwise added continuously at constant rates from their respective separate dropping nozzles: 216 g of aqueous acrylic acid solution of 80% (hereinafter, referred to as 80% AA) over a period of 180 minutes from the initiation of the polymerization; 57.6 g of aqueous hydrogen peroxide solution of 35% over a period of 90 minutes from the initiation of the polymerization; and 96 g of aqueous sodium persulfate solution of 15% (hereinafter, referred to as 15% NaPS) and 160 g of pure water over a 100-minute-long period of from 90 minutes till 190 minutes after the initiation of the polymerization. Thereafter, the boiling point reflux state was maintained over a period of 30 minutes from the end of all the dropwise additions, thus completing the polymerization.

After the completion of the polymerization, the pH and the concentration were adjusted to obtain the polymer A1 with pH of 7.5 and a solid component concentration of 45%. The weight-average molecular weight of the polymer A1, as measured in the above way, was 10,000.

In addition, the calcium ion scavengeability of the polymer A1, as measured in the above way, was 0.49. From this result, it could be confirmed that the polymer A1 satisfied the parameters of the polymer A as defined in the present invention.

Referential Example 2

The polymer A2, which was a maleic acid/acrylic acid copolymer with a molar ratio of 30/70, was produced as the polymer A.

Namely, 83.0 g of pure water, 250 g of 48% NaOH and 147.0 g of anhydrous MA were initially charged into a SUS-made separable flask of 2.5 liters in capacity as fitted with a thermometer, a stirrer and a reflux condenser. The resultant aqueous solution was heated so as to fall into a boiling point reflux state while being stirred. Thereafter, while the reflux state was maintained under stirred conditions, the following materials were dropwise added continuously at constant rates from their respective separate dropping nozzles: 315.0 g of 80% AA over a period of 120 minutes from the initiation of the polymerization; and 66.7 g of 15% NaPS and 393.3 g of pure water over a period of 130 minutes from the initiation of the polymerization. Thereafter, the boiling point reflux state was maintained over a period of 30 minutes from the end of all the dropwise additions, thus completing the polymerization.

After the completion of the polymerization, the pH and the concentration were adjusted to obtain the polymer A2 with pH of 7.5 and a solid component concentration of 40%. The weight-average molecular weight of the polymer A2, as measured in the above way, was 50,000.

In addition, the calcium ion scavengeability of the polymer A2, as measured in the above way, was 0.50. From this result, it could be confirmed that the polymer A2 satisfied the parameters of the polymer A as defined in the present invention.

Referential Example 3

The polymer B1, which was an acrylic acid homopolymer having a low molecular weight, was produced as the polymer B.

Namely, 560 g of pure water was initially charged into a SUS-made separable flask of 2.5 liters in capacity as fitted with a thermometer, a stirrer and a reflux condenser, and then this pure water was heated so as to fall into a boiling point reflux state while being stirred. Thereafter, while the reflux state was maintained under stirred conditions, the following materials were dropwise added continuously at constant rates from their respective separate dropping nozzles: 360 g of 80% AA and 283 g of 48% NaOH over a period of 240 minutes from the initiation of the polymerization; and 56 g of 15% NaPS and 600 g of pure water over a period of 250 minutes from the initiation of the polymerization. Thereafter, the boiling point reflux state was maintained over a period of 30 minutes from the end of all the dropwise additions, thus completing the polymerization.

After the completion of the polymerization, the pH and the concentration were adjusted to obtain the polymer B1 with pH of 7.5 and a solid component concentration of 45%. The weight-average molecular weight of the polymer B1, as measured in the same way as above, was 3,500.

In addition, the clay dispersibility of the polymer B1 in high-hardness water, as measured in the above way, was 0.90. From this result, it could be confirmed that the polymer B1 satisfied the parameters of the polymer B as defined in the present invention.

Examples 1

In the Examples 1 below, water-soluble polymers according to the present invention were produced by the use of the following polymers as produced in the Referential Examples: the polymers A1 and A2 as the polymers A having a calcium ion scavengeability of not less than 0.45, and further, the polymer B1 as the polymer B having a clay dispersibility of not less than 0.65 in high-hardness water. Then, the resultant water-soluble polymers were measured by the calcium ion scavengeability and the clay dispersibility in high-hardness water.

Example 1-1

A mortar was charged with 3 g of a dried powder of the polymer A1, obtained as the polymer A in Referential Example 1, and further with 7 g of a dried powder of the polymer B1, obtained as the polymer B in Referential Example 3, and then these powders were mixed with a pestle till the resultant mixture became perfectly uniform, thus producing a water-soluble polymer 1-1 comprising a ratio by weight of polymer A/polymer B=30/70.

The results of measuring the water-soluble polymer 1-1 by the calcium ion scavengeability and the clay dispersibility in high-hardness water are shown in Table 1.

Example 1-2

A water-soluble polymer 1-2, comprising a ratio by weight of polymer A/polymer B=50/50, was produced in the same way as of Example 1-1 except that the amount of the powder of the polymer A1 as the polymer A and the amount of the powder of the polymer B1 as the polymer B were both changed to 5 g.

The results of measuring the water-soluble polymer 1-2 by the calcium ion scavengeability and the clay dispersibility in high-hardness water are shown in Table 1.

Example 1-3

A water-soluble polymer 1-3, comprising a ratio by weight of polymer A/polymer B=70/30, was produced in the same way as of Example 1-1 except that the amount of the powder of the polymer A1 as the polymer A and the amount of the powder of the polymer B1 as the polymer B were changed to 7 g and 3 g respectively.

The results of measuring the water-soluble polymer 1-3 by the calcium ion scavengeability and the clay dispersibility in high-hardness water are shown in Table 1.

Example 1-4

A water-soluble polymer. 1-4, comprising a ratio by weight of polymer A/polymer B=80/20, was produced in the same way as of Example 1-1 except that the amount of the powder of the polymer A1 as the polymer A and the amount of the powder of the polymer B1 as the polymer B were changed to 8 g and 2 g respectively.

The results of measuring the water-soluble polymer 1-4 by the calcium ion scavengeability and the clay dispersibility in high-hardness water are shown in Table 1.

Example 1-5

A water-soluble polymer 1-5, comprising a ratio by weight of polymer A/polymer B=30/70, was produced in the same way as of Example 1-1 except using 3 g of a dried powder of the polymer A2, obtained as the polymer A in Referential Example 2, and further, 7 g of a dried powder of the polymer B1, obtained as the polymer B in Referential Example 3.

The results of measuring the water-soluble polymer 1-5 by the calcium ion scavengeability and the clay dispersibility in high-hardness water are shown in Table 1.

Example 1-6

A water-soluble polymer 1-6, comprising a ratio by weight of polymer A/polymer B=50/50, was produced in the same way as of Example 1-5 except that the amount of the powder of the polymer A2 as the polymer A and the amount of the powder of the polymer B1 as the polymer B were both changed to 5 g.

The results of measuring the water-soluble polymer 1-6 by the calcium ion scavengeability and the clay dispersibility in high-hardness water are shown in Table 1.

Example 1-7

A water-soluble polymer 1-7, comprising a ratio by weight of polymer A/polymer B=70/30, was produced in the same way as of Example 1-5 except that the amount of the powder of the polymer A2 as the polymer A and the amount of the powder of the polymer B1 as the polymer B were changed to 7 g and 3 g respectively.

The results of measuring the water-soluble polymer 1-7 by the calcium ion scavengeability and the clay dispersibility in high-hardness water are shown in Table 1.

Comparative Examples 1-8 to 1-10

The polymers A1, A2 and B1, as obtained in the Referential Examples, were measured as comparative examples by the calcium ion scavengeability and the clay dispersibility in high-hardness water. The results are collectively shown in Table 1.

TABLE 1

The results of Examples 1 and Comparative Examples 1

| | Water-soluble polymer | Polymer A | Polymer B | A/B (ratio by weight) | Calcium ion scavenge-ability | Clay dispersibility in high-hardness water |
|---|---|---|---|---|---|---|
| Example | | | | | | |
| 1-1 | 1-1 | A1 | B1 | 30/10 | 0.40 | 0.89 |
| 1-2 | 1-2 | A1 | B1 | 50/50 | 0.42 | 0.66 |
| 1-3 | 1-3 | A1 | B1 | 70/30 | 0.45 | 0.62 |
| 1-4 | 1-4 | A1 | B1 | 80/20 | 0.46 | 0.60 |
| 1-5 | 1-5 | A2 | B1 | 30/70 | 0.40 | 0.85 |
| 1-6 | 1-6 | A2 | B1 | 50/50 | 0.43 | 0.66 |
| 1-7 | 1-7 | A2 | B1 | 70/30 | 0.46 | 0.65 |
| Comparative Example | | | | | | |
| 1-8 | A1 | A1 | — | 100/0 | 0.49 | 0.09 |
| 1-9 | A2 | A2 | — | 100/0 | 0.50 | 0.14 |
| 1-10 | B1 | — | B1 | 0/100 | 0.36 | 0.90 |

From the above results, it was confirmed that the water-soluble polymer, according to the present invention, simultaneously displayed high functions with regard to both the calcium ion scavengeability and the clay dispersibility in high-hardness water.

Examples 2

In the Examples 2 below, the recontamination inhibitabilities of the water-soluble polymers according to the present invention, as obtained in the Examples 1 above, were measured by the below-mentioned process so that the water-soluble polymers might be evaluated as detergent compositions comprising the water-soluble polymers, wherein the provision of the detergent compositions is another object of the present invention.

<Recontamination Inhibitability>

(1) Cotton cloth according to JIS-L0803, obtained from the Japanese Laundry Research Association, was cut into pieces of 5 cm×5 cm to prepare white cloth. The whiteness degree of this white cloth was beforehand measured by the reflectance with a colorimetric color difference meter, ND-1001DP model, made by Nippon Denshoku Kogyo Co., Ltd.

(2) Hard water was prepared by adding pure water to 1.47 g of calcium chloride dihydrate to adjust the total weight to 5,000 g. This hard water and tap water for rising were immersed into a thermostat of 25° C.

(3) A Terg-O-Tometer was set to 25° C., and then 1 liter of the above hard water and 1 g of clay were placed into a pot of the Terg-O-Tometer and then stirred at 100 rpm for 1 minute. Thereafter, ten pieces of the white cloth were added, and then the contents of the pot were stirred at 100 rpm for 1 minute.

(4) To the above pot, 4 g of aqueous sodium carbonate solution of 5%, 4 g of aqueous sodium linear-chain-alkylbenzenesulfonate (LAS) solution of 5%, 0.15 g of zeolite and 5 g of aqueous polymer solution of 1% in terms of solid content were added, and then the contents of the pot were stirred at 100 rpm for 10 minutes.

(5) Water was drained off from the white cloth by hand, and then 1 liter of the tap water as adjusted to 25° C. in the above way was placed into the pot, and then its contents were stirred at 100 rpm for 2 minutes. This step was twice carried out.

(6) The above steps (3) to (5) were thrice repeated.

(7) The white cloth was dried while its wrinkles were ironed out with the white cloth covered by other cloth, and then the whiteness degree of the dried white cloth was measured by the reflectance with the above colorimetric color difference meter again.

(8) The recontamination-inhibiting ratio was calculated from the above measurement results in accordance with the following equation:

Recontamination-inhibiting ratio (%)=(whiteness degree after washing)/(whiteness degree of original white cloth)×100

Examples 2-1 to 2-7

The recontamination inhibitabilities of the water-soluble polymers 1-1 to 1-7 according to the present invention, as obtained in the Examples 1, were measured respectively by the above process. The results are collectively shown in Table 2.

Comparative Examples 2-8 to 2-10

Similarly, the polymers A1, A2 and B1, as obtained in the Referential Examples, were measured. The results are collectively shown in Table 2.

TABLE 2

The results of Examples 2 and Comparative Examples 2

| | Water-soluble polymer | Recontamination inhibitability |
|---|---|---|
| Example | | |
| 2-1 | 1-1 | 98.5 |
| 2-2 | 1-2 | 97.9 |
| 2-3 | 1-3 | 97.9 |
| 2-4 | 1-4 | 97.9 |
| 2-5 | 1-5 | 97.7 |
| 2-6 | 1-6 | 98.1 |
| 2-7 | 1-7 | 98.0 |
| Comparative Example | | |
| 2-8 | A1 | 96.6 |
| 2-9 | A2 | 96.7 |
| 2-10 | B2 | 97.3 |

As is evident from Table 2, the water-soluble polymer according to the present invention has more excellent recontamination inhibitability than conventional polymers.

Examples 3

In the Examples 3 below, the detergencies of the water-soluble polymers according to the present invention, as obtained in Examples 1 above, were measured by the below-mentioned process so that the water-soluble polymers might further be evaluated as detergent compositions comprising the water-soluble polymers, wherein the provision of the detergent compositions is another object of the present invention.

<Detergency>

(1) Cotton cloth according to JIS-L0803, obtained from the Japanese Laundry Research Association, was cut into pieces of 5 cm×5 cm to prepare white cloth. In addition, artificially contaminated wet cloth was also obtained from the Japanese Laundry Research Association. The whiteness degrees of these white cloth and contaminated cloth were beforehand measured by the reflectance with a colorimetric color beforehand measured by the reflectance with a colorimetric color difference meter, ND-1001DP model, made by Nippon Denshoku Kogyo Co., Ltd.

(2) Hard water was prepared by adding pure water to 1.47 g of calcium chloride dehydrate to adjust the total weight to 5,000 g. This hard water and tap water for rising were immersed into a thermostat of 25° C.

(3) A Terg-O-Tometer was set to 25° C., and then 500 ml of the above hard water and 5 pieces of the contaminated cloth and 5 pieces of the white cloth were placed into a pot of the Terg-O-Tometer and then stirred at 100 rpm for 1 minute.

(4) To the above pot, 2 g of aqueous sodium carbonate solution of 5%, 2 g of aqueous LAS solution of 5%, 0.075 g of zeolite and 10 g of aqueous polymer solution of 1% in terms of solid content were added, and then the contents of the pot were stirred at 100 rpm for 10 minutes.

(5) Water was drained off from the white cloth and the contaminated cloth by hand, and then 500 ml of the tap water as adjusted to 25° C. in the above way was placed into the pot, and then its contents were stirred at 100 rpm for 2 minutes. This step was twice carried out.

(6) The white cloth and the contaminated cloth were dried while their wrinkles were ironed out with the white cloth and the contaminated cloth respectively covered by other cloth, and then the whiteness degrees of the dried white cloth and the dried contaminated cloth were measured by the reflectance with the above colorimetric color difference meter again.

(7) The detergency was calculated from the above measurement results in accordance with the following equation:

Detergency (%)=[{(whiteness degree of contaminated cloth after washing)−(whiteness degree of contaminated cloth before washing)]/{(whiteness degree of original white cloth)−(whiteness degree of contaminated cloth before washing)}]×100

Examples 3-1 to 3-4

The detergencies of the water-soluble polymers 1-1 to 1-4 according to the present invention, as obtained in Examples 1, were measured respectively by the above process. The results are collectively shown in Table 3.

Comparative Examples 3-5 and 3-6

Similarly, the polymers A1 and B, as obtained in Referential Examples, were measured. The results are collectively shown in Table 3.

TABLE 3

The results of Examples 3 and Comparative Examples 3

| | Water-soluble polymer | Detergency |
|---|---|---|
| (Example 3) | | |
| 3-1 | 1-1 | 40.9 |
| 3-2 | 1-2 | 41.1 |
| 3-3 | 1-3 | 41.4 |
| 3-4 | 1-4 | 40.9 |
| (Comparative Example 3) | | |
| 3-5 | A1 | 36.5 |
| 3-6 | B1 | 34.1 |

As is evident from Table 3, the water-soluble polymer according to the present invention have much more excellent detergency than conventional polymers.

In addition, from the total results of the Examples 2 and the Examples 3, it is evident that the detergent composition according to the Examples 3, it is evident that the detergent composition according to the present invention is very excellent.

Examples 4

In the Examples 4 below, the viscosities of inorganic-pigment dispersions were measured with a B-type viscosimeter by the below-mentioned process in order to evaluate inorganic-pigment dispersants comprising the water-soluble polymers according to the present invention as obtained in Examples 1 above.

<Evaluation Process for Inorganic-pigment Dispersant>

(1) First of all, an aqueous polymer solution of 10% in terms of solid content was prepared.

(2) Next, 150 g of super pure water was placed into a plastic vessel of 600 ml, and thereto 70 g of light calcium carbonate, 105 g of heavy calcium carbonate and 175 g of Alphacoat were gradually added in this order while the contents of the vessel were stirred at 1,000 rpm with TK Homomixer (made by Tokushu Kika Kogyo Co., Ltd.; the Labodisper MR-L model was used as its stirring portion). If the pigment became difficult to disperse during its addition, the aqueous polymer solution of 10% in terms of solid content was fitly added.

(3) After all the pigments had been added, the aqueous polymer solution of 10% in terms of solid content was added to adjust the total weight to 10.5 g, and the contents of the vessel were stirred at 3,000 rpm for another 15 minutes.

(4) After being stirred, the resultant mixture was placed in a thermostat of 25° C. for 30 minutes. Then, the viscosity of the mixture was measured with the B-type viscosimeter by rotating its rotor for 3 minutes.

Examples 4-1 and 4-2

The water-soluble polymers 1-2 and 1-3 according to the present invention, as obtained in Examples 1, were evaluated as inorganic-pigment dispersants respectively by the above process.

As a result, the viscosity of the inorganic-pigment dispersion comprising the water-soluble polymer 1-2 was 464 mPa·s. In addition, the viscosity of the inorganic-pigment dispersion comprising the water-soluble polymer 1-3 was 492 mPa·s.

Comparative Example 4-3

Similarly, the polymer B1, as obtained in Referential Example 3, was measured. The viscosity of the inorganic-pigment dispersion comprising the polymer B1 was 6,640 mPa·s.

From the above results, it was found that the inorganic-pigment dispersant comprising the water-soluble polymer according to the present invention had excellent dispersibility.

Examples 5

In the Examples 5 below, the calcium carbonate scale inhibitability was measured by the below-mentioned process in order to evaluate water-treating agents comprising the water-soluble polymers according to the present invention as obtained in Examples 1 above.

<Calcium Carbonate Scale Inhibitability>

(1) First of all, an aqueous calcium chloride dihydrate solution of 1.56%, an aqueous sodium hydrogencarbonate solution of 3% and an aqueous polymer solution of 0.2% in terms of solid content were prepared.

(2) Next, 170 g of pure water was placed into a glass bottle of 225 ml in capacity. Then, 10 g of the aqueous calcium chloride dihydrate solution of 1.56% and 3 g of the aqueous polymer solution of 0.2% in terms of solid content were mixed into the pure water, and further thereto 10 g of the aqueous sodium hydrogencarbonate solution and 7 g of sodium chloride were added, with the result that the entire contents of the bottle amounted to 200 g.

(3) The bottle containing the resultant aqueous supersaturated calcium carbonate solution of 530 ppm was closed up tight, and then this solution was heated at 70° C.

(4) Then, after cooling, the resultant precipitate was filtered off with a membrane filter of 0.1 μm, and the resultant filtrate was analyzed in accordance with JIS-K0101.

(5) The calcium carbonate scale inhibition rate (%) was calculated from the above measurement results in accordance with the following equation:

Scale inhibition rate (%)={(C−B)/(A−B)}×100 wherein:

A is the concentration (ppm) of calcium which was dissolved in the solution before the test;

B is a concentration (ppm) of calcium in a filtrate resultant from a solution to which the water-soluble polymer was not added in the test; and C is a concentration (ppm) of calcium in a filtrate resultant from a solution to which the water-soluble polymer was added in the test.

Examples 5-1 and 5-2

The scale inhibitabilities of the water-soluble polymers 1-2 and 1-3 according to the present invention, as obtained in Examples 1, were measured respectively by the above process.

As a result, the scale inhibitability of the scale inhibitor comprising the water-soluble polymer 1-2 was 49%. In addition, the scale inhibitability of the scale inhibitor comprising the water-soluble polymer 1-3 was 58%.

Comparative Example 5-3

Similarly, the polymer A1, as obtained in Referential Example, was measured. The scale inhibitability of the scale inhibitor comprising the polymer A1 was 21%.

From the above results, it was found that the water-soluble polymer according to the present invention could effectively be utilized also as a water-treating agent.

Examples 6

In the Examples 6 below, a bleaching test was carried out by the below-mentioned process in order to evaluate fiber-treating agents comprising the water-soluble polymers according to the present invention as obtained in Examples 1 above.

<Bleaching Test>

(1) First of all, a fiber-treating agent solution was prepared. Namely, 10 g of hydrogen peroxide, 2 g of sodium hydroxide, 5 g of #3 sodium silicate and 2 g of the water-soluble polymer were dissolved into 1 liter of water which had been prepared by dissolving calcium chloride dihydrate into pure water so as to have a concentration of 50 ppm in terms of calcium carbonate.

(2) Next, plain-stitch-knitted cotton fabrics which had been scoured were bleached with the fiber-treating agent solution under conditions of bath ratio=1/25 and temperature=85° C. for 30 minutes.

After being bleached, the fabrics were evaluated by the feeling and the whiteness degree. The feeling of the fabrics was evaluated according to the three-grade system of "soft", "somewhat hard", and "considerably hard" by a sensory examination method. The whiteness degree was evaluated with the colorimetric color difference meter as used for evaluating the detergency.

Examples 6-1 and 6-2

The water-soluble polymers 1-5 and 1-7 according to the present invention, as obtained in Examples 1, were evaluated from what feeling and what whiteness degree they gave by the above process.

As a result, the fiber-treating agent comprising the water-soluble polymer 1-5 gave a soft feeling and a whiteness degree of 85. In addition, the fiber-treating agent comprising the water-soluble polymer 1-7 gave a soft feeling and a whiteness degree of 80.

Comparative Example 6-3

Similarly, the polymer B1, as obtained in Referential Example, was measured. The fiber-treating agent comprising the polymer B1 gave a somewhat hard feeling and a whiteness degree of 66.

Therefore, the fiber-treating agent comprising the water-soluble polymer according to the present invention was found to exhibit good bleaching ability.

Various details of the invention may be changed without departing from its spirit not its scope. Furthermore, the foregoing description of the preferred embodiments according to the present invention is provided for the purpose of illustration only, and not for the purpose of limiting the invention as defined by the appended claims and their equivalents.

What is claimed is:

1. A water-soluble polymer, which has a calcium ion scavengeability of not less than 0.40 g $CaCO_3$ per gram of solid polymer, and further has a clay dispersibility of not less than 0.50 in high-hardness water wherein said clay dispersibility is determined in high-hardness water having a calcium concentration of 200 ppm in terms of calcium carbonate.

2. A water-soluble polymer according to claim 1, which comprises a water-soluble poly(carboxylic acid)-based polymer having a structural unit derived from a monoethylenically unsaturated monocarboxylic acid (or salt) monomer and/or a structural unit derived from a monoethylenically unsaturated dicarboxylic acid (or salt) monomer.

3. A water-soluble polymer according to claim 1, which comprises a polymer mixture including polymers A and B as essential components wherein the polymer A has a calcium ion scavengeability of not less than 0.45 g $CaCO_3$ per gram of solid polymer, and wherein the polymer B has a clay dispersibility of not less than 0.65 in high-hardness water, wherein the polymer mixture has physical properties such that the calcium ion scavengeability is not less than 0.40 g $CaCO_3$ per gram of solid polymer, and that the clay dispersibility is not less than 0.60 in high-hardness water.

4. A water-soluble polymer according to claim 2, which comprises a polymer mixture including polymers A and B as essential components wherein the polymer A has a calcium ion scavengeability of not less than 0.45 g $CaCO_3$ per gram of solid polymer, and wherein the polymer B has a clay dispersibility of not less than 0.65 in high-hardness water, wherein the polymer mixture has physical properties such that the calcium ion scavengeability is not less than 0.40 g $CaCO_3$ per gram of solid polymer, and that the clay dispersibility is not less than 0.60 in high-hardness water.

5. A water-soluble polymer according to claim 3, wherein the mixing ratio by weight of polymer A/polymer B is in the range of 20/80 to 95/5.

6. A water-soluble polymer according to claim 4, wherein the mixing ratio by weight of polymer A/polymer B is in the range of 20/80 to 95/5.

7. A detergent composition, which comprises the water-soluble polymer as recited in claim 1.

8. A detergent composition, which comprises the water-soluble polymer as recited in claim 2.

9. A detergent composition, which comprises the water-soluble polymer as recited in claim 3.

10. A detergent composition, which comprises the water-soluble polymer as recited in claim 4.

11. A detergent composition, which comprises the water-soluble polymer as recited in claim 5.

12. A detergent composition, which comprises the water-soluble polymer as recited in claim 6.

* * * * *